United States Patent
Viens et al.

(10) Patent No.: US 9,509,810 B2
(45) Date of Patent: *Nov. 29, 2016

(54) MODIFIED ETHERNET PREAMBLE FOR INTER LINE CARD COMMUNICATIONS IN A MODULAR COMMUNICATION CHASSIS

(71) Applicant: Accedian Networks Inc., St-Laurent (CA)

(72) Inventors: Yanick Viens, St-Jean-sur-Richelieu (CA); Steve Rochon, Brossard (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,845

(22) Filed: Nov. 19, 2015

(65) Prior Publication Data

US 2016/0072931 A1    Mar. 10, 2016

Related U.S. Application Data

(63) Continuation of application No. 14/485,874, filed on Sep. 15, 2014, now Pat. No. 9,225,634, which is a continuation of application No. 13/626,095, filed on Sep. 25, 2012, now Pat. No. 8,867,545.

(51) Int. Cl.
*H04J 3/24* (2006.01)
*H04L 29/06* (2006.01)
(Continued)

(52) U.S. Cl.
CPC ........... *H04L 69/22* (2013.01); *H04L 12/2892* (2013.01); *H04L 12/462* (2013.01); *H04L 45/502* (2013.01); *H04L 45/74* (2013.01); *H04L 49/351* (2013.01); *H04L 49/9057* (2013.01)

(58) Field of Classification Search
CPC ....... H04L 69/22; H04L 65/06; H04L 69/04; H04L 45/502; H04L 45/74

USPC .............. 370/474, 445, 522, 523, 528, 465; 709/223, 236, 246, 249
See application file for complete search history.

(56) References Cited

U.S. PATENT DOCUMENTS 6,188,689 B1 * 2/2001 Katsube .............. H04L 12/4608
370/252
7,043,541 B1 * 5/2006 Bechtolsheim ..... H04L 41/0663
709/223
(Continued)

FOREIGN PATENT DOCUMENTS

| CN | 103684901 | 3/2014 |
| WO | WO 01/91375 | 11/2001 |
| WO | WO 2009/034450 | 3/2009 |

OTHER PUBLICATIONS

On detecting service violations and bandwidth theft in QoS network domains, Ahsan Habib, et al., CERIAS and Department of Computer Sciences, Purdue University, Aug. 7, 2002 (11 pages).
(Continued)

*Primary Examiner* — Chi H Pham
*Assistant Examiner* — Alexander O Boakye
(74) *Attorney, Agent, or Firm* — Nixon Peabody LLP

(57) ABSTRACT

A method of providing information regarding an Ethernet frame, within the Ethernet preamble of the Ethernet frame, comprises inserting into the Ethernet preamble an inter-line-card header that includes a start control character, a version number, a parity bit, a source port, a destination port, and a forwarding domain entry; and preserving said inter-line-card header, inside of said Ethernet preamble, in a Media Access Control (MAC) sub-layer in said Ethernet frame. The method may include a step of selecting the decoding format for the inter-line-card header corresponding to the version number and/or forwarding other Ethernet frames according to additional forwarding information provided by the forwarding domain entry. The inter-line-card header may be preserved in the MAC sub-layer by keeping the Ethernet preamble at the beginning of an Ethernet frame received over an Ethernet backplane, and passing the combined preamble and associated Ethernet frame to an inter-line-card header processing module.

4 Claims, 6 Drawing Sheets

(51) Int. Cl.
  *H04L 12/46*   (2006.01)
  *H04L 12/723*  (2013.01)
  *H04L 12/741*  (2013.01)
  *H04L 12/861*  (2013.01)
  *H04L 12/28*   (2006.01)
  *H04L 12/931*  (2013.01)

(56) References Cited

U.S. PATENT DOCUMENTS

| | | |
|---|---|---|
| 7,599,308 B2 | 10/2009 | Laver et al. |
| 7,706,271 B2 | 4/2010 | Wakayama et al. |
| 7,876,696 B2 | 1/2011 | Kotelba |
| 7,958,238 B1 | 6/2011 | Batz et al. |
| 8,139,485 B2 | 3/2012 | Arseneault et al. |
| 8,867,545 B2 | 10/2014 | Viens et al. |
| 2006/0215574 A1 | 9/2006 | Padmanabhan et al. |
| 2007/0081561 A1 | 4/2007 | Heninger et al. |
| 2007/0171862 A1* | 7/2007 | Tang ............ H04W 74/02 370/329 |
| 2008/0008095 A1 | 1/2008 | Gilfix |
| 2008/0130494 A1 | 6/2008 | Kaluskar |
| 2009/0034596 A1 | 2/2009 | Chen et al. |
| 2009/0103548 A1 | 4/2009 | Weiss |
| 2010/0157804 A1 | 6/2010 | Bugenhagen |
| 2011/0158101 A1 | 6/2011 | Figueira |

OTHER PUBLICATIONS

Bradner, S. et al. "Benchmarking Methodology for Network Interconnect Devices." The Internet Society, Mar. 1999, XP015008327 (32 pages).
Stein, Y. "Y.ethoam—RFC2544 Features." International Telecommunication Union. vol. 5/13, Aug. 29, 2005 (3 pages).
Extended European Search Report mailed Dec. 20, 2013, issued in European Patent Application No. 13 18 3169.5 (6 pages).

* cited by examiner

MODIFIED ETHERNET PREAMBLE FOR INTER LINE CARD COMMUNICATIONS IN A MODULAR COMMUNICATION CHASSIS

CROSS REFERENCE TO RELATED APPLICATIONS

This application is a continuation of and claims priority to U.S. application Ser. No. 14/485,874, filed Sep. 15, 2014, now allowed, which is a continuation of U.S. application Ser. No. 13/626,095, filed Sep. 25, 2012, now U.S. Pat. No. 8,867,545, which is hereby incorporated by reference herein in its entirety.

FIELD OF THE INVENTION

This invention is directed towards the use of a modified Ethernet preamble to carry information across an Ethernet backplane between a plurality of line cards, each with a plurality of communication ports for the purpose of Ethernet ring protection and other Ethernet services.

BACKGROUND OF THE INVENTION

In a telecommunication chassis with multiple ports, it is useful to use a modular communication chassis design with a plurality of line cards, each with a plurality of communication ports to allow for various densities of ports in the said chassis to address multiple applications and deployment scenarios. Using Ethernet as the backplane for the said modular communication chassis is useful, particularly when the data to be exchanged between one or more main boards and a plurality of communication line cards involve Ethernet frames.

The Ethernet preamble is a 64-bit field that contains a synchronization pattern consisting of alternating ones and zeros and ending with two consecutive ones. After synchronization is established, the preamble is used to locate the first bit of the packet.

The embodiment allows a modular system using an Ethernet backplane, for communication between a main board and a plurality of line cards, to redefine an IEEE 802.3 Ethernet preamble to share information and actions about Ethernet frames to be passed between different communication line cards. The shared information and actions are inserted in-line for each Ethernet frame to process to reduce the system overhead and streamline the operation between a plurality of communication line cards.

SUMMARY OF THE INVENTION

In accordance with one embodiment, a method of providing information regarding an Ethernet frame, within the Ethernet preamble of the Ethernet frame, comprises inserting into the Ethernet preamble an inter-line-card header that includes a start control character, a version number, a parity bit, a source port, a destination port, and a forwarding domain entry; and preserving said inter-line-card header, inside of said Ethernet preamble, in a Media Access Control (MAC) sub-layer in said Ethernet frame. The method may include a step of selecting the decoding format for the inter-line-card header corresponding to the version number and/or forwarding other Ethernet frames according to additional forwarding information provided by the forwarding domain entry. The inter-line-card header may be preserved in the MAC sub-layer by keeping the Ethernet preamble at the beginning of an Ethernet frame received over an Ethernet backplane, and passing the combined preamble and associated Ethernet frame to an inter-line-card header processing module.

In one implementation, the start control character indicates the beginning of a new Ethernet frame; the parity bit is used to verify that an inter line card header is not corrupted, whereby the parity bit is set to reflect an even or an odd parity; the source port identifies the source of the Ethernet frame on the communication line card from which the Ethernet frame received over the Ethernet backplane originates; and the destination port identifies the port on which to transmit the Ethernet frame for the communication line card where the Ethernet frame is received. The destination port may be extracted from the inter-line-card header, and then used to determine which Ethernet port of a communication line card shall be used to send the associated Ethernet frame.

The inter-line-card header may include an action and action parameters, and in one implementation the action includes controlling or modifying the associated Ethernet frame by pushing or popping an MPLS label, adding an MPLS label, setting the time to live (TTL) for an MPLS label, decrementing an MPLS TTL, setting an MPLS TTL to a specific value, pushing or popping a VLAN tag, setting or decrementing an Internet Protocol (IP) TTL field, setting the committed information rate (CIR) and the excess information rate (EIR) to new values, or resetting the CIR and EIR to known values for the Ethernet Virtual Circuit to which the Ethernet frame belongs. The action parameters may be applied according to the action as decoded in the inter-line-card header.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
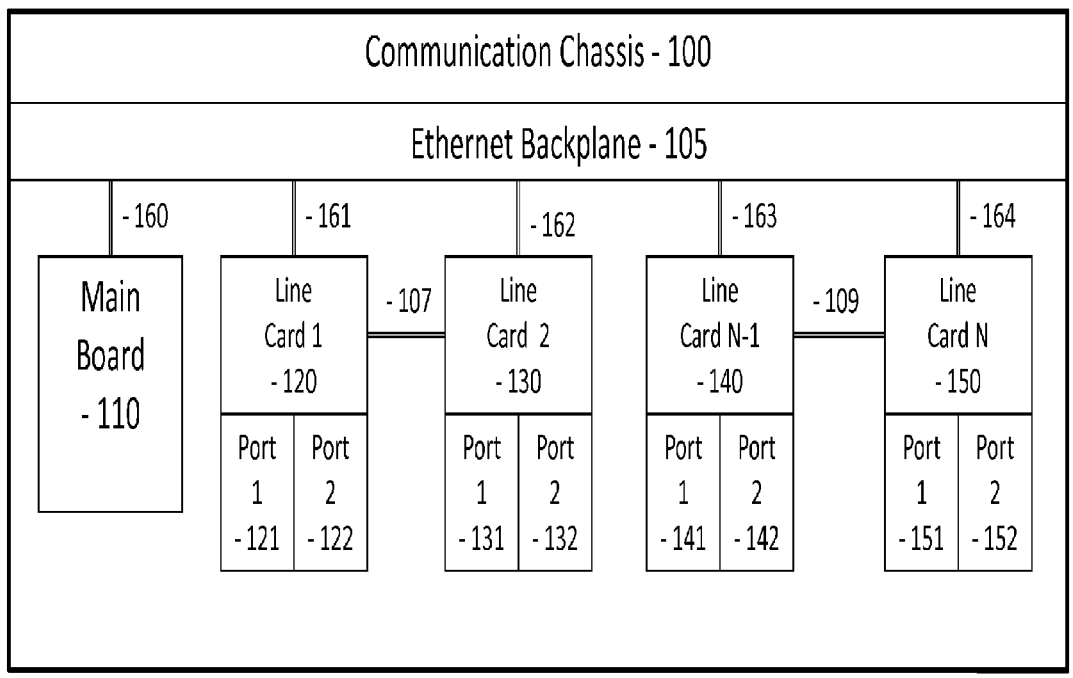
FIG. 1 depicts a modular communication chassis.

Turning now to the drawings and referring first to FIG. 1, a modular communication chassis 100 is depicted. It is made up of at least one main board 110 and a plurality of communication line cards (120, 130, 140, 150) interconnected via Ethernet links 160, 161, 162, 163, 164 via a common Ethernet backplane 105 operating according to standard speed tiers of IEEE 802.3 Ethernet standard, for instance at 1 Gigabit per second or 10 Gigabit per second. Each communication line card (120, 130, 140, 150) is made up of a plurality of communication ports (121 and 122, 131 and 132, 141 and 142, 151 and 152). In addition to the common Ethernet backplane 105, and when used for functions such as link aggregation in an Ethernet protection ring implementation (for instance as per the ITU G.8032v2 standard), communication line cards are grouped in pairs and have a direct Ethernet link 107, 109 between each pair of communication line cards. The pair of communication line cards (120, 130) is directly connected via Ethernet link 107 and the pair of communication line cards (140, 150) is directly connected via Ethernet link 109. These point to point Ethernet links (107, 109) are dedicated between a pair of communication line cards (120 and 130, 140 and 150) and are used to improve the overall performance of the modular communication chassis 100.

Figure 2:
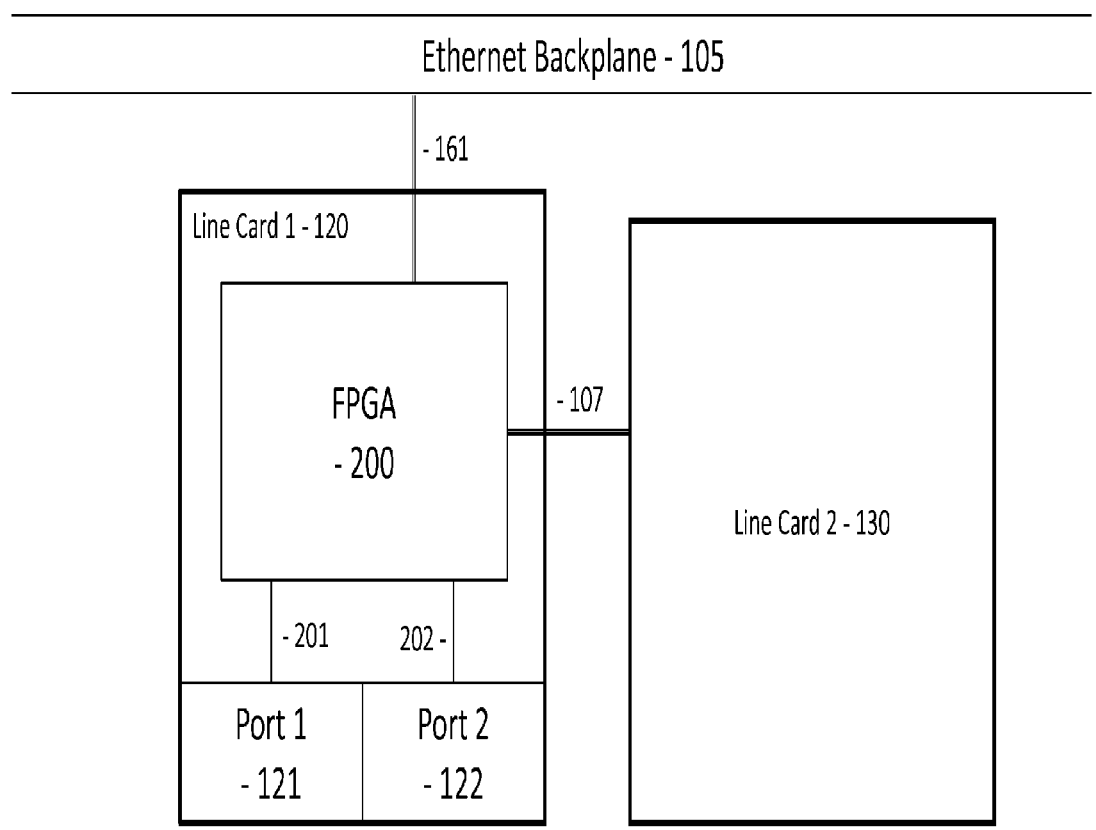
FIG. 2 depicts a communication line card with a plurality of communication ports.

FIG. 2 depicts the key components of a communication line card (120, 130, 140, 150). Line card 120 will be used as an example. Communication line card 120 has a pair of Ethernet links 161, 107 to communicate with other elements of the modular communication chassis 100. Ethernet link 161 interconnects the communication line card 120 to every other communication line card in the modular communication chassis 100 and to the one or more main boards 110. Ethernet link 107 is used to interconnect the communication line card to another communication line card 130 as a point-to-point link for additional flexibility and performance. A Field Programmable Gate Array (FPGA) 200 is used to implement the MAC sub-layer of the Internet Protocol (IP) stack. The FPGA 200 is responsible for handling all of the Ethernet links: 161 used for the backplane link 105 and 107 used for the point to point link with communication line card 130. It is also responsible for handling ports 121 and 122 on the communication line card 120. The Ethernet ports 121 and 122 can operate either over a copper interface or an optical interface 201, 202.

Figure 3:
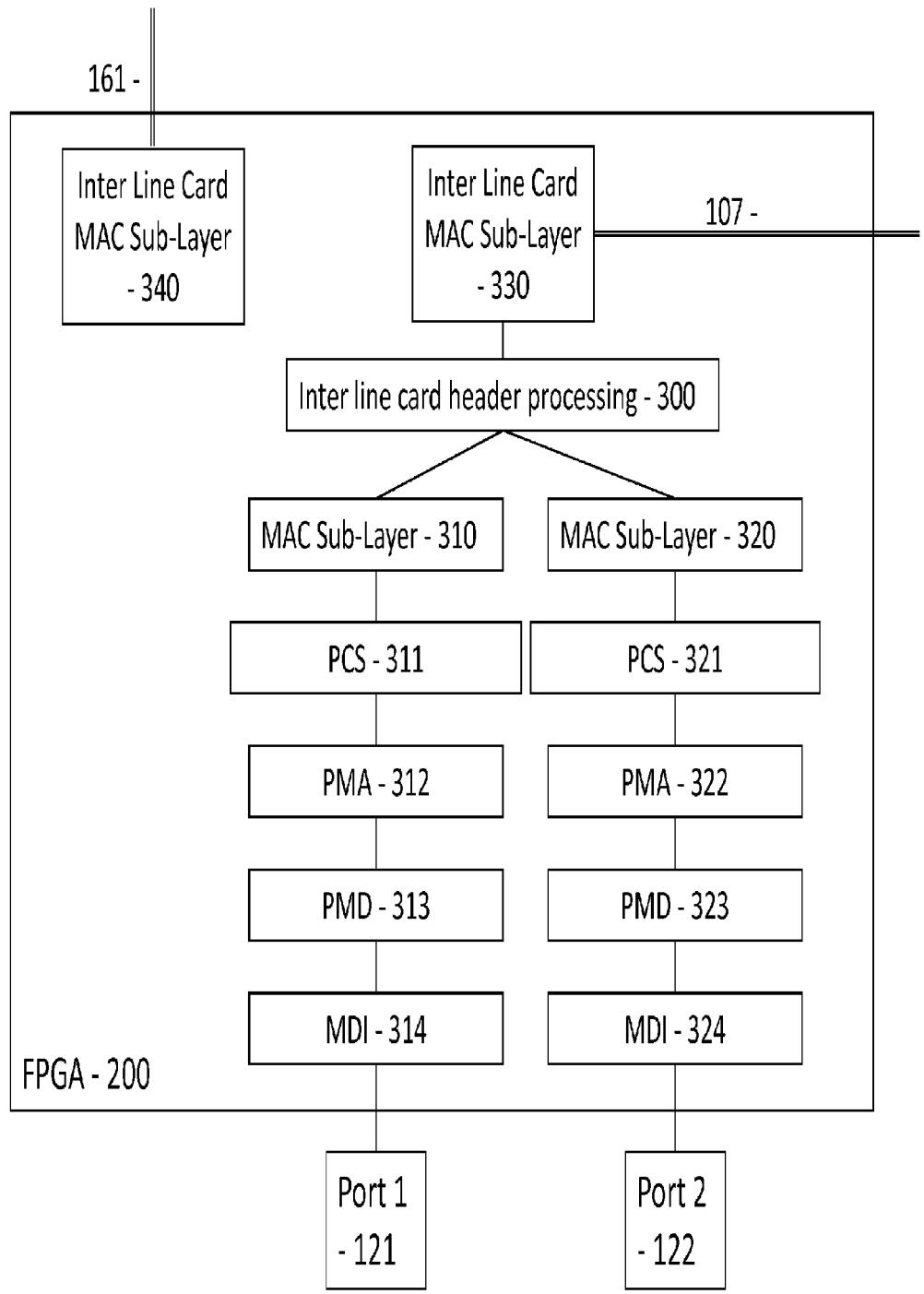
FIG. 3 depicts the modular architecture of an FPGA at the core of a communication line card.

FIG. 3 depicts the key functional modules of an FPGA 200 used to implement the MAC sub-layer for the Ethernet backplane link 161, the point to point inter communication line card link 107 and the plurality of Ethernet ports (121, 122). More specifically, a complete MAC sub-layer protocol stack, as defined by the IEEE 802.3 standard is supported for Ethernet ports 121 and 122. For each such Ethernet port (121, 122), the MAC sub-layers include the Media Dependent Interface (MDI) (314, 324), the Physical Medium Dependent (PMD) sub-layer (313, 323), the Physical Medium Attachment (PMA) sub-layer (312, 322), the Physical Coding Sub-layer (PCS) (311, 321) and the Medium Access Control (MAC) sub-layer (310, 320). Furthermore, the FPGA 200 also implements the inter line card Medium Access Control (MAC) sub-layer 330 to handle the point to point link 107 to the other communication line card 130 in the pair of line cards used for instance for a link aggregation function and the inter line card Medium Access Control (MAC) sub-layer 340 to handle the connection 161 to the Ethernet backplane of the modular communication chassis 100. The Ethernet link 161 and 107 operate as per the XGMII (10 Gigabit Media Independent Interface) protocol or alternatively as per the GMII (Gigabit Media Independent Interface) protocol).

Since the XGMII and GMII protocols operate above the inter line card MAC sub-layer (330, 340), there is no need to implement a full MAC sub-layer protocol stack on Ethernet interfaces 161 and 107 because Ethernet frames on these links (161, 107) are never directly transmitted over a copper or optical interface before they are processed by the inter line card header processing module 300. The MAC sub-layer 330 handling the Ethernet link 107 is used for the data traffic to and from the other communication line card in the pair of communication line cards (120 and 130, 140 and 150) while MAC sub-layer 340 interfaces to the Ethernet link 161 and is used as a management and control plane interface with other communication line cards (120, 130, 140, 150) and the main board 110 in a modular communication chassis 100. In another embodiment, Ethernet link 161 is also used to convey data traffic originating from other communication line cards (120, 130, 140, 150) not necessarily paired to a communication line card via a dedicated Ethernet link (107, 109).

This embodiment may couple communication line cards together in pairs (120 and 130, 140 and 150) for instance when used to perform a link aggregation function to support an Ethernet ring protection protocol such as ITU G.8032v2. In order to share information about each frame transferred from one communication line card to another (120 and 130, 140 and 150), it is useful to insert information about how an Ethernet frame should be handled directly in the Ethernet frame itself.

Figure 4:
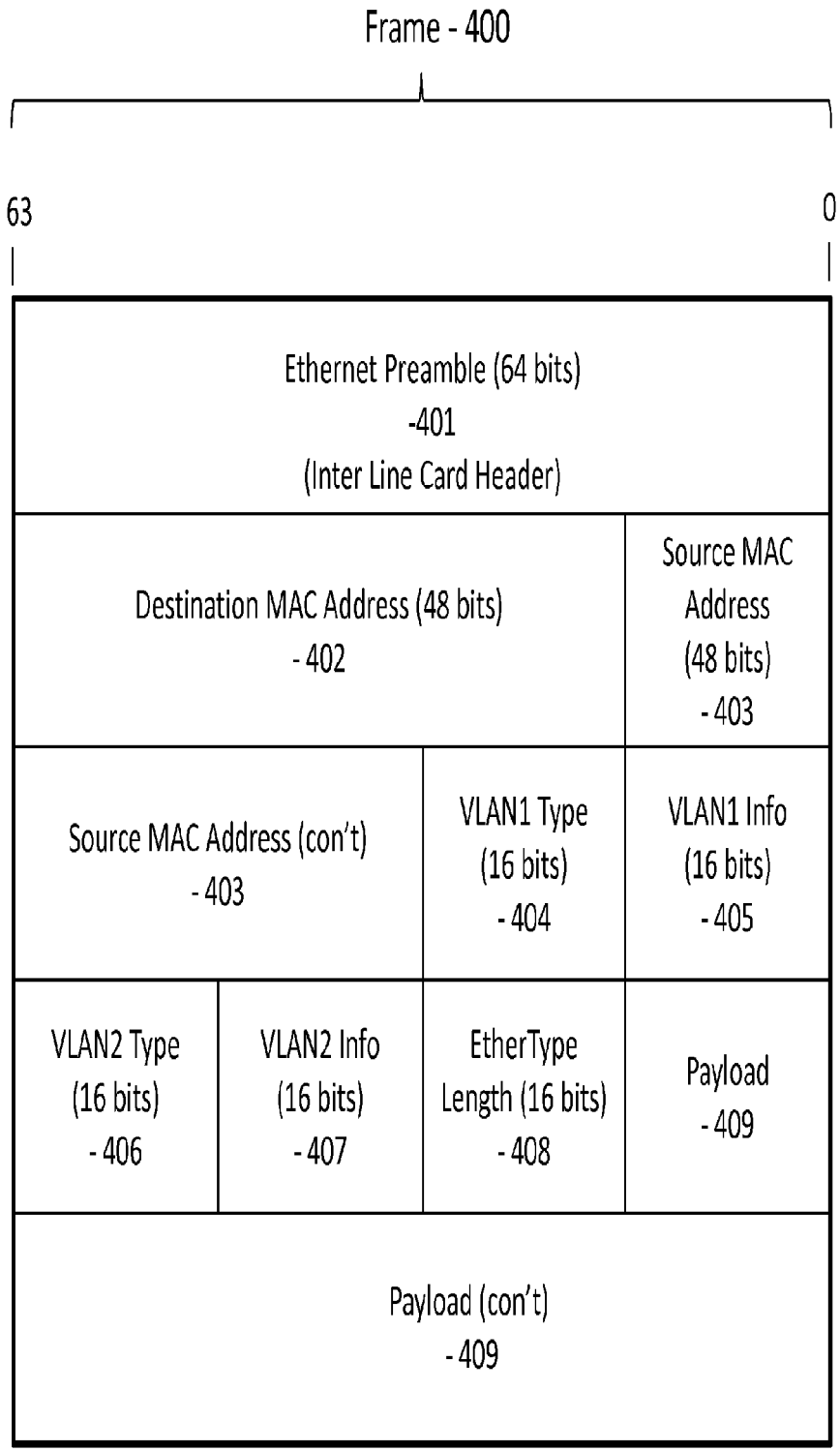
FIG. 4 depicts a typical Ethernet frame.

Looking at FIG. 4, in order to minimize the protocol overhead required to transfer additional information about an Ethernet frame 400 between a pair of communication line cards (120 and 130, 140 and 150), the Ethernet preamble 401 is redefined to convey information about the Ethernet frame 400 that is prefixed by the Ethernet preamble 401. As per the IEEE 802.3 standard, an Ethernet preamble 401 is made up of a 64 bit stream with a unique pattern. A traditional MAC sub-layer implementation will usually remove the Ethernet preamble 401 before passing the frame 400 to the Ethernet protocol stack. The inter line card MAC sub-layer (330, 340) is modified to preserve the Ethernet preamble 401 for additional processing by the inter line card header processing module 300 before passing the Ethernet frame to the appropriate MAC sub-layer (310, 320) and down the respective sub-layer modules until the Ethernet frame reaches the Ethernet port (121, 122). Looking at the Ethernet frame 400, it is preceded by a modified Ethernet preamble 401 redefined as an inter line card header. The remainder of the Ethernet frame 400 is as per the IEEE 802.3 standard and consists of a 48 bit destination MAC address 402 and a 48 bit source MAC address 403. When the IEEE 802.1D standard is used as part of a VLAN implementation, there may be a plurality of VLAN tags 404, 405, 406, 407 inserted after the source MAC address 403. A first VLAN is seen and it is made up of a VLAN1 type field 404 and of a first VLAN info field 405. A second VLAN is also seen, this time made up of a second VLAN2 type field 406 and of a VLAN info field 407. Finally, an Ethertype field 408 and a data payload 409 complete the Ethernet frame 400.

By redefining the standard Ethernet preamble 401 as an inter line card header, it is possible to share information about each frame without the overhead of an extra frame or other inter line card mechanism such as, but not limited to, other Ethernet frames, shared RAM, hardware registers, and other methods known to those familiar with the art.

Figure 5:
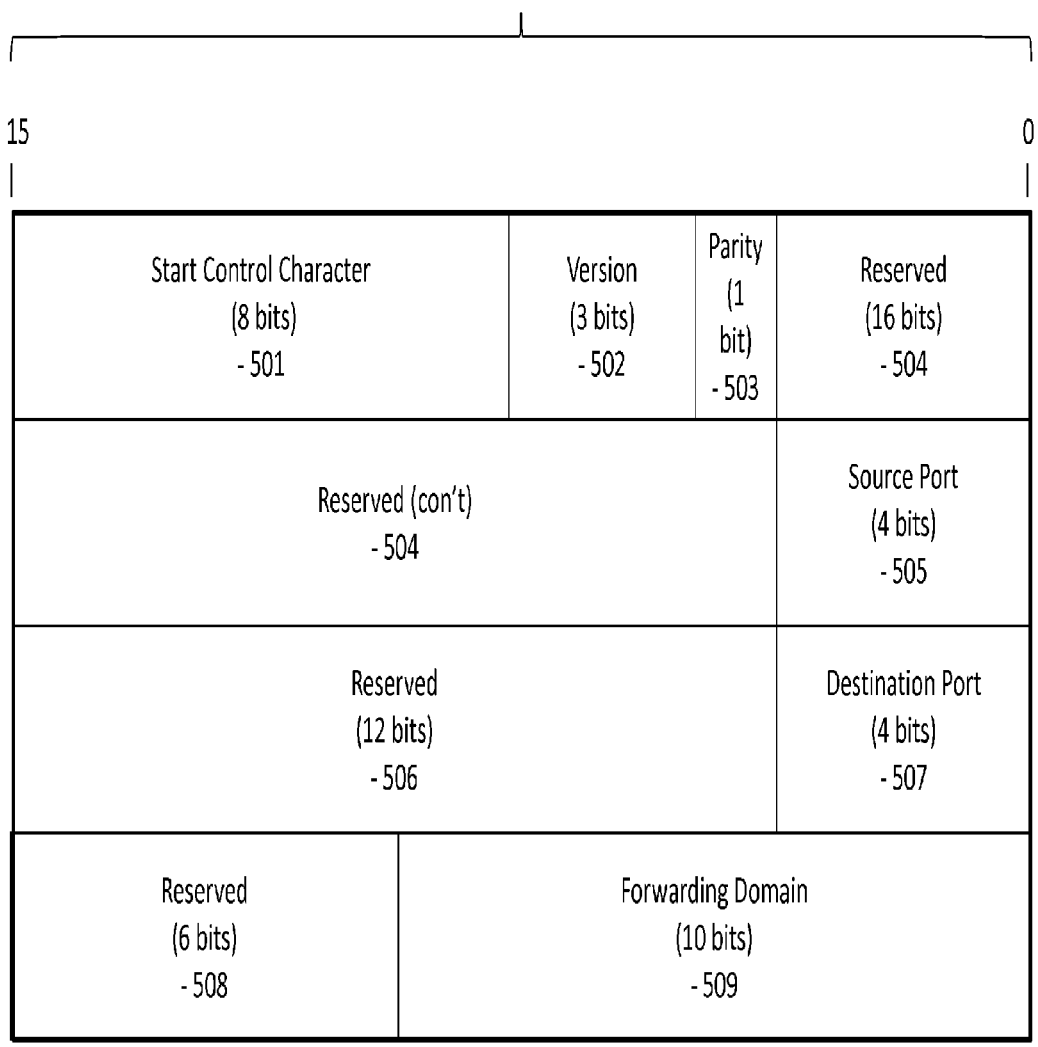
FIG. 5 depicts a modified Ethernet preamble.

In FIG. 5, a first embodiment of the inter line card header 401 is illustrated. The inter line card header 401 includes a start control character 501 to mark the beginning of a new Ethernet frame 400. This is followed by a version number 502 to differentiate an inter line card header 401 that is redefined using a different format. An even or odd parity bit 503 is used as a simple and efficient method to detect a corrupted inter line card header 401. This is followed by a 16 bit field 504 reserved for future use. The source port 505 then follows along with another 12 bit field 506 reserved for future use. The next field designates the destination port 507 to be used to transmit this Ethernet frame 400 by the communication line card receiving this Ethernet frame 400.

The next 6 bit field 508 is reserved for future use. The last field in the inter line card header 401 is the forwarding domain 509. The forwarding domain 509 is used to provide information regarding this Ethernet frame 400 with regards to the forwarding domain 509 of the source communication line card (120, 130, 140, 150) and how it should be applied by the communication line card (120, 130, 140, 150) receiving the Ethernet frame 400. It is necessary to convey this information as part of the inter line card header 401 since the other communication line card (120, 130, 140, 150) may not have enough information to determine or discover this forwarding domain 509 information on its own. For instance, by saving the forwarding domain 509 information associated with the source MAC address 403 of the Ethernet frame 400, the communication line card (120, 130, 140, 150) implicitly learns how to handle this MAC address the next time it sees it used as the destination MAC address 402 in a subsequent Ethernet frame 400.

The information extracted from the inter line card header 401 is used by the inter line card header processing module 300 on a communication line card (120, 130, 140, 150) to select which destination Ethernet port (121, 122, 131, 132, 141, 142, 151, 152) should be used to handle this Ethernet frame 400. The ordering and the number of bits used to encode the information of the different fields making up the inter line card header 401 can be modified by someone familiar with the art without changing the scope or the meaning of this invention.

The modular communication chassis 100 may be used for a variety of functions. In another embodiment, each communication line card (120, 130, 140, 150) can enforce specific actions for the inter line card header processing module 300 when processing an Ethernet frame 400, including the ability to modify specific header information at various protocol layers. While some of the actions may be predefined or configured for each communication line card (120, 130, 140, 150), it is desirable to convey frame specific actions as part of the inter line card header 401.

Figure 6:
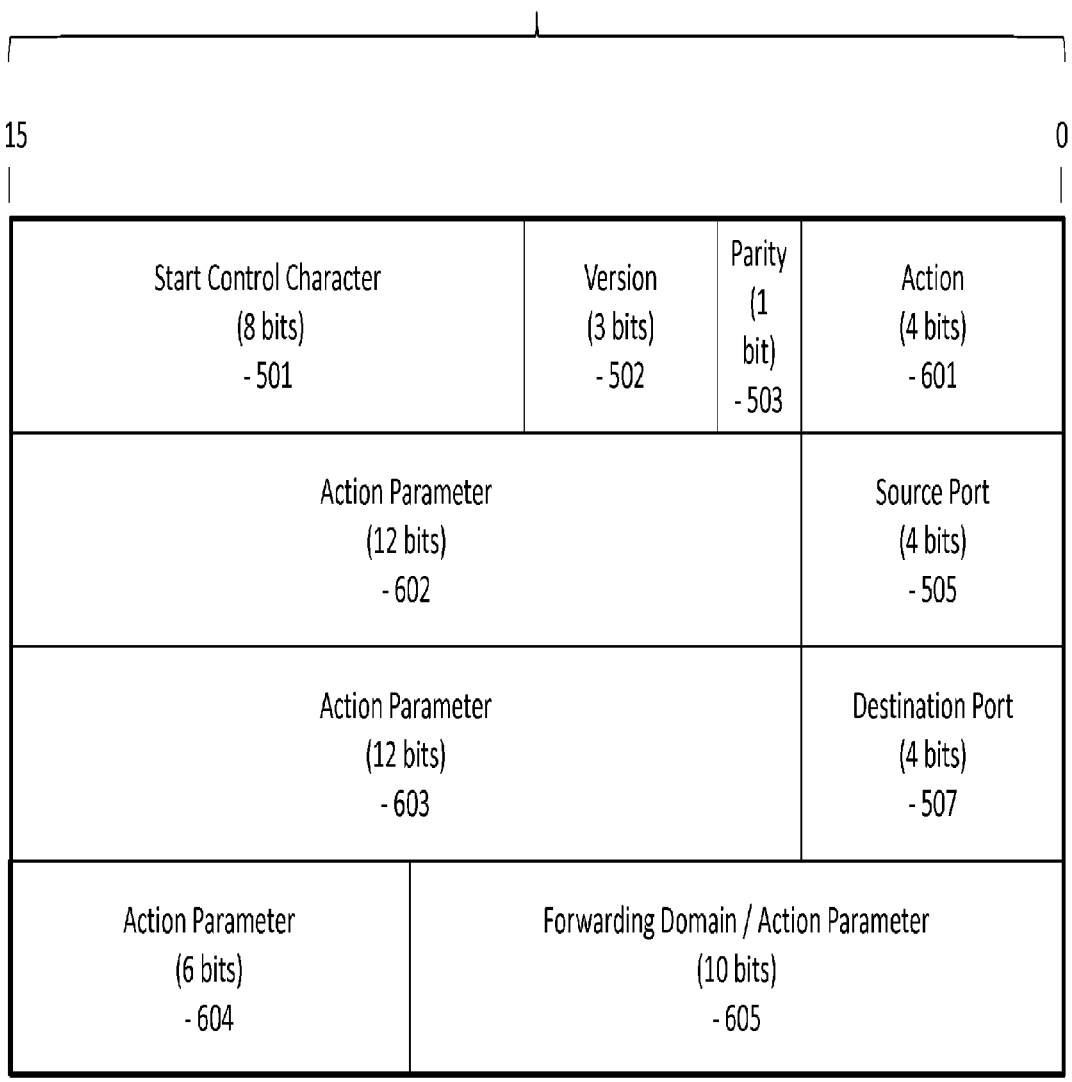
FIG. 6 depicts a differently modified Ethernet preamble.

Looking at FIG. 6, an alternate embodiment of the inter line card header 401 is illustrated. The fields that were originally reserved for future use (504, 506 and 508) and the forwarding domain 509 are redefined in this other embodiment of the inter line card header 401. More specifically, an action field 601 is defined. The action field 601 defines one of a plurality of possible actions to be applied to the Ethernet frame 400. For instance, the action field 601 can be used to push or pop a Multi-Protocol Label Switching (MPLS) label, add an MPLS label, set the time to live (TTL) for an MPLS label, decrement an MPLS TTL or set an MPLS TTL to a specific value. The action field 601 may also be used to push or pop a Virtual LAN (VLAN) tag (as per the IEEE 802.1q standard). The action field 601 may also be used to set or decrement an Internet Protocol (IP) TTL field. Another use of the action field 601 could be to set the committed information rate (CIR) and the excess information rate (EIR) to new values or to reset the CIR and EIR to known values for the Ethernet virtual circuit that the Ethernet frame 400 belongs to. In another embodiment of the inter line card header 401, it is possible to encode the action field 601 using more than 4 bits to add other actions as required. The action parameter fields (602, 603, 604, 605) represent a total of 40 bits that can be used to convey the necessary parameters to the action field 601. The encoding of the action parameter fields (602, 603, 604, 605) will vary depending on the specific value of the action field 601. In order to accommodate actions that require more than 40 bits to encode the associated parameters, it is possible to redefine other fields that are currently preserved as is from FIG. 5. As was the case for FIG. 5, the embodiment illustrated by FIG. 6 may rely on different ordering of the fields and the number of bits used to encode the information of the different fields making up the inter line card header 401 can be modified by someone familiar with the art without changing the scope or the meaning of this invention.

In an embodiment, when communicating over the Ethernet backplane 105, a standard Ethernet preamble 401 is used to allow the use of an existing off-the-shelf Ethernet switch chip set. In another embodiment, the inter line card header 401 can also be used on the Ethernet backplane 105 by using an FPGA 200 or another programmable device as the Ethernet switch in order to preserve the inter line card header 401 of an Ethernet frame 400 switched toward a destination communication line card (120, 130, 140, 150) or main board 110. When sending an Ethernet frame 400 over a dedicated Ethernet link (107, 109) between a pair of communication line cards (120 and 130, 140 and 150), the MAC sub-layer 330 operates in promiscuous mode and disregards the destination MAC address 402 in the Ethernet frame 400.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of providing information regarding an Ethernet frame for transmission within a communication chassis with a plurality of line cards interconnected via an Ethernet backplane and via point to point links, said method comprising:
    modifying, at one of said plurality of line cards, an Ethernet preamble of the Ethernet frame to include the information regarding the Ethernet frame, creating a modified Ethernet preamble;
    preserving by a Media Access Control (MAC) sub-layer module said modified Ethernet preamble; and
    transmitting said modified Ethernet frame to another one of said plurality of line cards located within said communication chassis.

2. The method of claim 1 wherein the information regarding the Ethernet frame comprises at least one of a start control character, a version number, a parity bit, a source port, a destination port, a forwarding domain entry, an action field, and an action parameter.

3. A method of efficiently transmitting an Ethernet frame between a plurality of line cards of a communication chassis, said method comprising:
    modifying an Ethernet preamble of said Ethernet frame to include information associated with the Ethernet frame, creating a modified Ethernet preambleJoe Bassett <joebassett@dawnequipment.com>
    preserving by a Media Access Control (MAC) sub-layer module said modified Ethernet preamble; and
    transmitting said modified Ethernet frame to another one of said plurality of line cards located within said communication chassis.

4. The method of claim 3 wherein the information associated with the Ethernet frame comprises at least one of a start control character, a version number, a parity bit, a source port, a destination port, a forwarding domain entry, an action field, and an action parameter.

* * * * *